Patented May 17, 1932

1,858,771

UNITED STATES PATENT OFFICE

HELLMUT FISCHER, OF BERLIN-SIEMENSSTADT, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

PROCESS FOR THE PRODUCTION OF BERYLLIUM OXIDE OR BERYLLIUM HYDROXIDE FROM TECHNICAL ALKALI-BERYLLIUM DOUBLE HALIDES, IN PARTICULAR FLUORIDES

No Drawing. Application filed January 17, 1931, Serial No. 509,541, and in Germany June 4, 1930.

The invention relates to a process which permits the production of pure beryllium oxide or beryllium hydroxide by comparatively simple means. In this, as the initial substances, are used alkali-beryllium double halides, in particular fluorides, as produced for example by the decomposition of beryl by means of alkali-silico-fluoride.

In consequence of the highly complex nature in particular of the alkali-beryllium double fluorides, it is not possible to fully separate the beryllium by known means as for example by precipitation with ammonia as hydroxide from the aqueous solutions of these compounds.

Particularly disadvantageous for a technical use of the precipitates so obtained, is the fact that even with long continued washing of the precipitate with water a hydroxide free of fluorine can never be obtained but always only a more or less strongly basic fluoride. Such a product however cannot be used either for the production of pure beryllium or for other technically important beryllium compounds. Finally there is also the fact that the precipitate recovered according to the above process is, on account of slimy character, extremely difficult to filter and wash.

According to the present invention the alkali-beryllium-halide is treated with strong caustic alkali, containing the same alkali-metal as in the double halide. If for example sodium- or potassium-beryllium-fluoride is used as the initial material, then this is introduced into a solution of the strongest possible sodium or potassium hydroxide, stirring well, and preferably in the cold. Owing to the action of the strong caustic the complex fluoride is completely decomposed.

The potassium fluoride separates out quantitatively and the potassium-beryllate remaining can be separated from the solution by known means as for example by filtering or centrifuging. The residual liquid is strongly diluted and heated. There is formed a thick and easily filtered precipitate of beryllium-hydroxide which is entirely free from fluorine and, after washing, is also free from alkali. The beryllium-hydroxide can be converted by heating in known manner, into beryllium-oxide.

About 30% caustic alkali is advantageously used for the decomposition of the alkali-beryllium double fluorides. After separation of the precipitated alkali fluorides by filtering or centrifuging, as described above, the separated and highly diluted mother liquor is advantageously heated to 70°–80° C. to precipitate the beryllium hydroxide.

Instead of diluting and heating the solution containing the beryllium, a treatment with acid can if necessary be also used, when the superfluous alkali is neutralized and the alkali-beryllate is converted into the beryllium salt of the corresponding acid, from which the hydroxide can then be formed by treatment with alkali. But in practice the before mentioned method is to be preferred.

I claim:

1. A process for the production of beryllium oxide or beryllium hydroxide from technical alkali-beryllium double halides, which comprises treating the alkali-beryllium double halide with a strong caustic alkali solution containing the same alkali metal as the double halide and further treating the solution, after separation of the alkali-halide precipitate, to obtain beryllium hydroxide.

2. A process for the production of beryllium oxide or beryllium hydroxide from technical alkali-beryllium double halides, which comprises treating an alkali-beryllium double fluoride with a strong caustic alkali solution containing the same alkali metal as the double fluoride and further treating the solution, after separation of the alkali-fluoride precipitate, to obtain beryllium hydroxide.

3. A process for the production of beryllium oxide or beryllium hydroxide from technical alkali-beryllium double halides, which comprises treating a sodium-beryllium double fluoride with a strong solution of sodium hydroxide, separating the so precipitated sodium fluoride and strongly diluting and heating the remaining solution to about 70–80° C.

In testimony whereof I affix my signature.

HELLMUT FISCHER.